(12) United States Patent
Khimji

(10) Patent No.: US 8,342,036 B2
(45) Date of Patent: Jan. 1, 2013

(54) DIFFERENTIAL PRESSURE ANEMOMETER

(76) Inventor: Hussein Khimji, Buckinghams (GB)

( * ) Notice: Subject to any disclaimer, the term of this patent is extended or adjusted under 35 U.S.C. 154(b) by 209 days.

(21) Appl. No.: 12/674,498

(22) PCT Filed: Aug. 22, 2008

(86) PCT No.: PCT/GB2008/002879
§ 371 (c)(1),
(2), (4) Date: Feb. 22, 2010

(87) PCT Pub. No.: WO2009/024803
PCT Pub. Date: Feb. 26, 2009

(65) Prior Publication Data
US 2011/0094311 A1    Apr. 28, 2011

(30) Foreign Application Priority Data

Aug. 23, 2007  (GB) .................................. 0716461.9
Jan. 15, 2008  (GB) .................................. 0800662.9

(51) Int. Cl.
*G01F 1/46* (2006.01)

(52) U.S. Cl. .................................................. 73/861.65

(58) Field of Classification Search ............... 73/761.65, 73/861.66, 861.64, 861.42
See application file for complete search history.

(56) References Cited

U.S. PATENT DOCUMENTS

| | | | | |
|---|---|---|---|---|
| 4,453,419 A | | 6/1984 | Engelke | |
| 5,069,073 A | * | 12/1991 | Barrett | 73/756 |
| 5,736,651 A | * | 4/1998 | Bowers | 73/861.66 |
| 6,189,390 B1 | * | 2/2001 | Platt | 73/861.66 |
| 6,237,426 B1 | * | 5/2001 | Gryc et al. | 73/861.66 |
| 6,487,918 B1 | * | 12/2002 | DeAngelis | 73/861.66 |

FOREIGN PATENT DOCUMENTS

| | | |
|---|---|---|
| CA | 2504074 A1 | 10/2006 |
| GB | 2164159 A | 3/1986 |
| GB | 2298281 A | 8/1996 |

OTHER PUBLICATIONS

PCT International Search Report, Mar. 23, 2009.
PCT Written Opinion.

* cited by examiner

*Primary Examiner* — Jewel V Thompson
(74) *Attorney, Agent, or Firm* — Westman, Champlin & Kelly, P.A.; Z. Peter Sawicki

(57) ABSTRACT

A pitot-static device, comprising first and second pluralities of hollow spokes extending in a radial direction from a central hub, the hollow interiors of the spokes of the first plurality being connected so as to allow fluid communication therebetween, and at least all but one of the spokes of the first plurality having at least one aperture facing in a first axial direction that is transverse to the radial direction, and the hollow interiors of the spokes of the second plurality being connected so as to allow fluid communication therebetween, and at least one of the spokes of the second plurality having an aperture at an end portion thereof that faces in the radial direction.

28 Claims, 6 Drawing Sheets

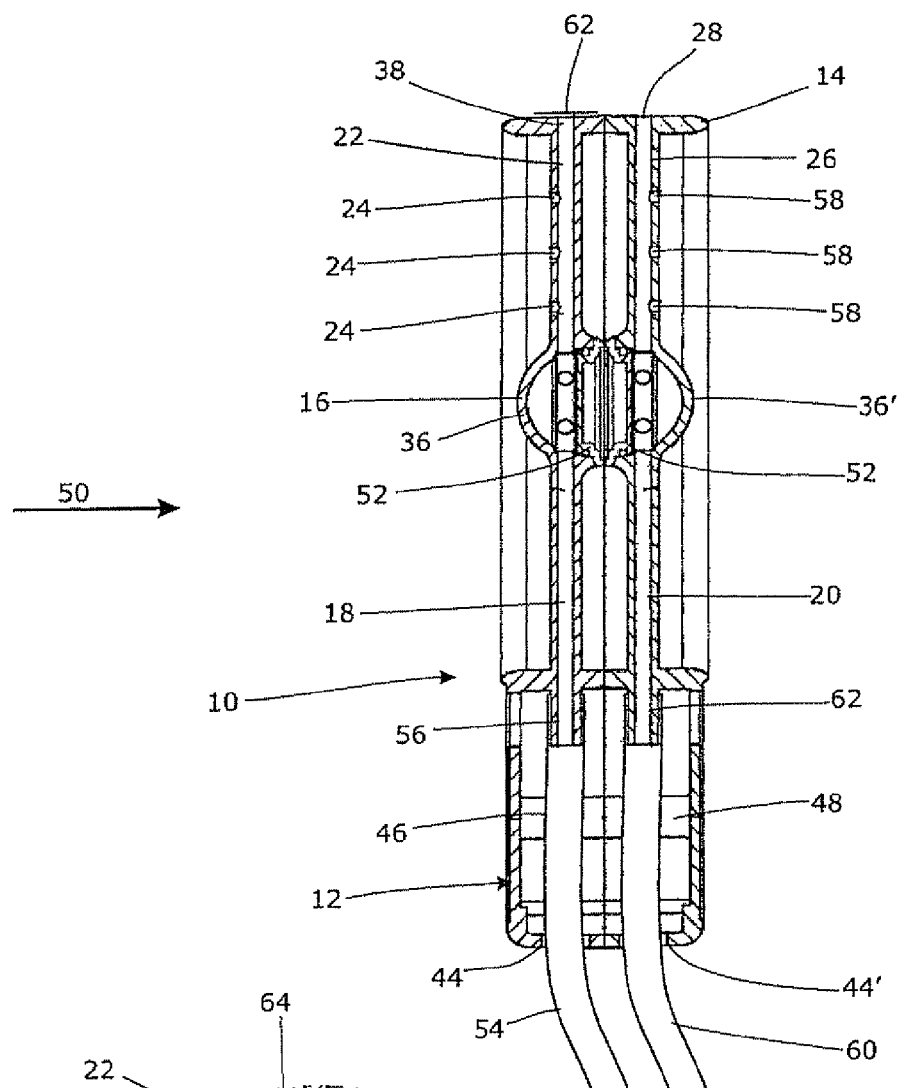
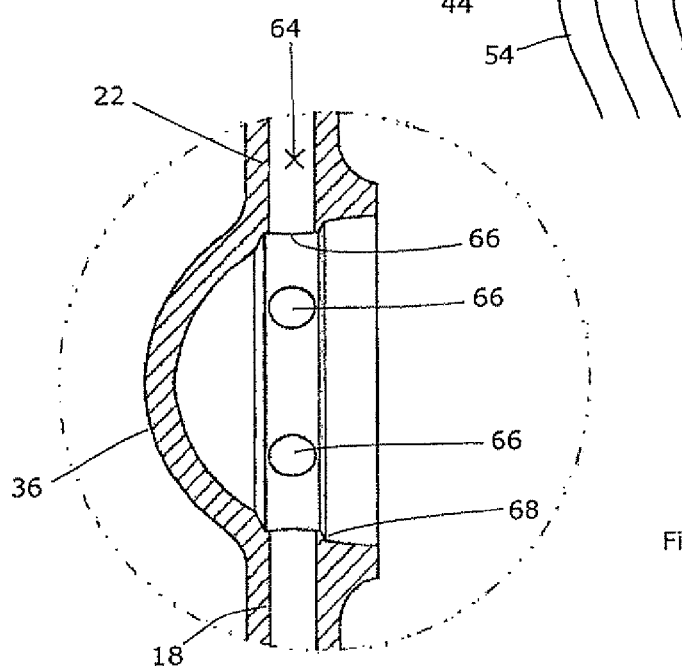
Fig 4
Fig 5

DIFFERENTIAL PRESSURE ANEMOMETER

This Application is a Section 371 National Stage Application of International Application No. PCT/GB2008/002879, filed Aug. 22, 2008 and published as WO 2009/024803 A2 on Feb. 26, 2009, the content of which is hereby incorporated by reference in its entirety.

FIELD OF THE INVENTION

The present invention relates to a pitot-static device.

BACKGROUND ART

There are a range of airflow measurements for which an anemometer is the preferred solution. These include spot measurements of airflow are variable locations, such as beneath ceiling-mounted air-conditioning vents, for example. At such locations, it is aesthetically undesirable and technically unnecessary to provide a fixed or otherwise permanent airflow sensor, so a technician will take a handheld sensor to the location and hold it in the airflow of the vent Such sensors typically comprise a rotateable vane that is mounted within a circular protective ring. The vane is typically of a metallic or plastics material, and a Hall effect or optical sensor in a handle portion extending from the ring can detect when one of the blades of the vane passes by. From this, the rotational speed of the vane can be determined, and knowledge of the aerodynamic properties of the vane will allow this to be converted to an airflow speed in the vicinity of the sensor.

Such anemometers suffer from distinct difficulties in practice. Principally, the rotating vane will have an inertia which must be overcome. This will impose a reaction time on the sensor output, and will make the sensor insensitive to small airflows. This can be reduced by reducing the mass of the vane, for example by using thin gauge sheet of a lightweight material such as aluminum, but such measures will reduce the rigidity of the vane and make it vulnerable to deformation on rough handling or shock, for example. Such deformation will change the aerodynamic properties of the vane and affect the accuracy of the sensor.

Further, the rotating vane is a moving part and hence in principle more vulnerable to wear, degradation, and the like.

Pitot-static devices are also used for measurement of airflow, as (for example) disclosed in GB-A-2,164,159. These are however bulky and have not been used for "on-the-spot" measurement via a handheld device.

A product known as the "Wilson Flow Grid" allows the measurement of airflow in a conduit such as a heating, ventilation or air-conditioning conduit or duct. It comprises a pair of square or circular grids of hollow conduits transverse to the airflow, one in front of the other. The frontmost grid has apertures in the sides of the conduits, facing into the airflow; these allow the dynamic pressure to be sampled. The rearmost grid has apertures on the two lateral sides of the conduit, at approximately 90° to the airflow, to sample the static pressure. In a rectangular grid (for a rectangular section conduit), the conduits form a gridiron pattern. In a circular grid (for a circular section conduit), the conduits are arranged as spokes from a central hub.

U.S. Pat. No. 4,453,419 shows a flow measurement device for use in a conduit, with two sets of radially-extending hollow spokes, one in front of the other. The spokes have apertures on their outer faces; thus one set has apertures facing forwards and one has apertures facing rearwardly. Each set of spokes emanates from one of two central hubs, from which dynamic and static pressure measurement are taken.

These devices are only suitable for use in fixed ducts or conduits, however. They are bulky and heavy, and not suited to portable use.

SUMMARY OF THE INVENTION

The present invention seeks to provide a handheld airflow measurement device that employs pitot-static principles instead of a rotating vane. A pitot-static device needs no moving parts and has little or no inertia.

In its first aspect, the present invention therefore provides a pitot-static device comprising a first plurality of hollow spokes and a second plurality of hollow spokes separated by an unimpeded flow path, the spokes of the first plurality being connected so as to allow fluid communication between their hollow interiors and each having at least one aperture facing in a first axial direction that is transverse to the spokes, the spokes of the second plurality being connected so as to allow fluid communication between their hollow interiors and each having at least one aperture facing in a second axial direction that is opposed to the first axial direction.

Such a device differs from the Wilson Flow Grid due to the location of the static ports. This change assists the accuracy of the device in measuring low rate airflows, and also allows the device to be made symmetrical. The latter advantage means that the device can be assembled from two identical half-mouldings and can be bi-directional; all these advantages assist in the creation of a handheld pitot-static device.

The spokes can extend radially from a central hub, with the hollow interiors of the spokes connected via one or more interior spaces within the hub. This allows the device to adopt a form and structure more closely resembling an anemometer, thereby clarifying it suitability as a direct replacement.

The second plurality of spokes can each have an aperture at the end thereof, which allows a more accurate determination of the static pressure. To maintain the symmetricality of the device and allow its manufacture as two half-mouldings, the spokes of the first plurality can also have an aperture at an end thereof, although that will need to be sealed against fluid communication at (perhaps) a later stage of manufacture. These end apertures can be additional to or as a replacement for the reverse-directed apertures of the second plurality.

The device can comprise a handle for manual support, to allow it to be carried and located as required. Alternatively, or in addition, it can comprise a socket for attaching the device to a pole or other support.

In another aspect, the present invention provides a pitot-static device comprising a first plurality of hollow spokes extending radially from a central hub and a second plurality of hollow spokes extending in a radial direction from a central hub, the spokes of the first plurality being connected so as to allow fluid communication between their hollow interiors, and at least all but one having at least one aperture facing in a first axial direction that is transverse to the radial direction, the spokes of the second plurality being connected so as to allow fluid communication between their hollow interiors, and at least all but one having at least one aperture, the device further comprising a handle for manual support. Having a handle, the device will be suited to portable uses; by combining this with a pitot-static measurement of airflow, the problems inherent in anemometer-based devices are avoided.

In this aspect, at least all but one of the spokes of the second plurality preferably has an aperture at an end portion thereof that faces in the radial direction. Likewise, for simplicity of manufacture, at least one of the spokes of the first plurality also preferably has an aperture at an end thereof which is sealed against fluid communication. The device of any of the above aspects can further comprise a ring around the central hub, the spokes extending from the hub to an inner face of the ring. Where some or all spokes have an aperture at the end thereof, the end apertures can extend through the ring.

A handle (where provided) can be conveniently attached to the ring. A conduit can usefully be provided between the central hub and the handle, to convey the pressure measurements to the handle and hence to an external measurement apparatus such as via a connector on the handle for external fluid conduits. The conduit preferably has no apertures between the central hub and the handle, as apertures on the conduit would contribute disproportionately to the pressure measurement.

The hub can be formed of a moulding integral with the spokes, covered by a suitable cap. This assists greatly in the manufacture of the device as simply as possible, and the present invention therefore also relates to such a device.

BRIEF DESCRIPTION OF THE DRAWINGS

An embodiment of the present invention will now be described by way of example, with reference to the accompanying figures in which;

FIG. 4 shows a longitudinal section through the device of FIG. 1;

FIG. 5 shows an enlarged view of a region of FIG. 4;

DETAILED DESCRIPTION OF THE EMBODIMENTS

Figure 1:
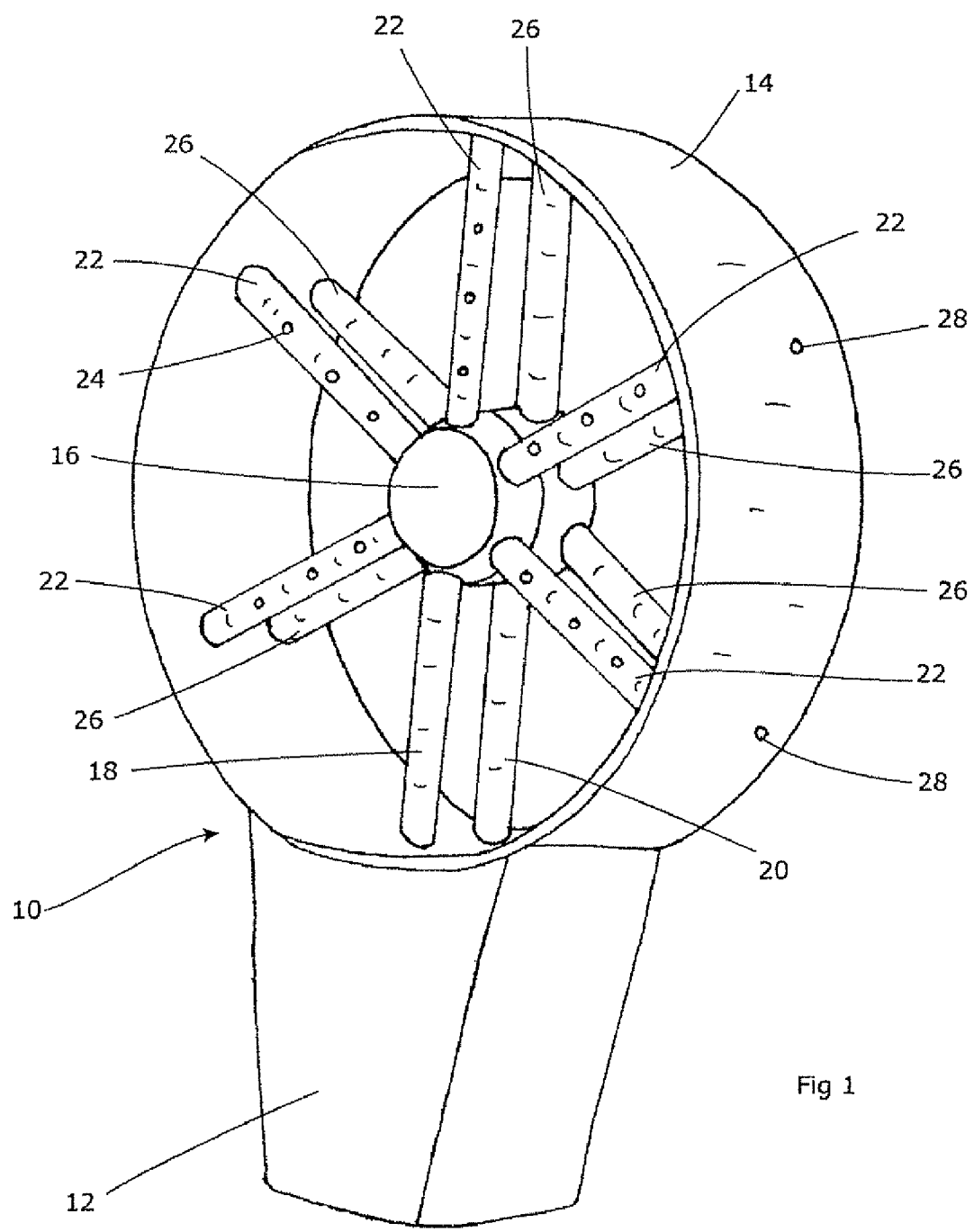
FIG. 1 shows a perspective view of a device according to the invention.

FIG. 1 shows a device according to the present invention. An airflow meter 10 comprises a handle 12 attached to an outer surface of a ring 14. The ring 14 comprises a short cylindrical section that serves to define a flow passage. The device measures the rate of flow of a fluid through that passage.

A central hub 16 is located substantially concentrically within the ring 14 and has two internal spaces, as will be described later. The central hub 16 is generally streamlined so as to cause relatively little disturbance to an airflow through the ring 14. Each internal space is connected to a respective conduit 18, 20 that extends from the central hub 16 to the interior of the handle 12. Within the handle 12, connectors are provided to allow the conduits 18, 20 to be linked to flexible tubes leading to an external micromanometer for measuring pressure differences between the two conduits 18, 20. The micromanometer may be as described in GB-A-2298281, for example.

Two arrays of spokes are located between the central hub 16 and the ring 14, one in front of the other. The first array consists of five spokes 22 with hollow interiors communicating with one interior space of the hub 16 and thence conduit 18. Together with the conduit 18, these spokes are spaced at 60° intervals to form a symmetrical pattern. Each spoke 22 has a plurality of apertures 24 on the front face thereof, in this case three although there could be one, two or more than three apertures. As they are located on the front face of the spoke 22, they face into an airflow that is flowing through the ring 14 and therefore sense a dynamic pressure created by that airflow.

The conduit 18 does not have any apertures. If an aperture on the conduit 18 did not face into the airflow then it would affect the dynamic pressure reading. If it did face into the airflow in the same orientation as the apertures 24 of the spokes 22, then it would sense the same dynamic pressure but the apertures of the conduit 18 would be in a different topological location relative to the micromanometer and the hub 16 as compared to the apertures 24, and this might distort the measured pressure. Accordingly, we prefer (as shown in FIG. 1) to provide a sealed conduit 18.

The second array of five spokes 26 are each located behind a spoke of the first array, and together with the conduit 20 are again spaced at 60° intervals. Each has three apertures (not visible in FIG. 1) that are diametrically opposed to the apertures 24 of the first array of spokes 22, i.e. point in an opposite direction. Again, there need not be three apertures although we find that this number is convenient. These apertures point in the lee direction of an airflow through the ring 14 and therefore sense a static pressure. That static pressure is fed through the conduit 20 and thence to the micromanometer. As a result, the micromanometer has access to a static and a dynamic pressure measurement and the airflow speed can be calculated using known techniques.

In addition to the apertures in the lee of the airflow, the spokes 26 of the second array each have an aperture 28 at an end thereof that extends through the ring 14 to the circumferential exterior face thereof. These allow a more balanced measurement of the static pressure.

The conduit 20 has no apertures, for the same reasons as set out above in relation to the conduit 18.

Although five spokes in each array are shown, each forming (with its respective conduit) a symmetrical pattern with a rotational symmetry of 6, this number can be varied and strict symmetricality could be departed from. A balanced pattern with few spokes is likely to cause the least disturbance to the airflow being measured, although more spokes will provide for a greater number of sampling points in the airflow. We therefore prefer a symmetrical 6-spoke arrangement, but other arrangements are also likely to yield good results.

The spokes of the two arrays are shown as being aligned in the direction of the airflow, so that for each spoke of the first array there is a spoke of the second array directly behind it. Again, we prefer this arrangement as it is likely to cause the least disturbance to airflow, but other arrangements could be adopted, including arrangements in which the spokes of different arrays are not aligned and arrangements in which the arrays have different numbers of spokes.

Figure 2:
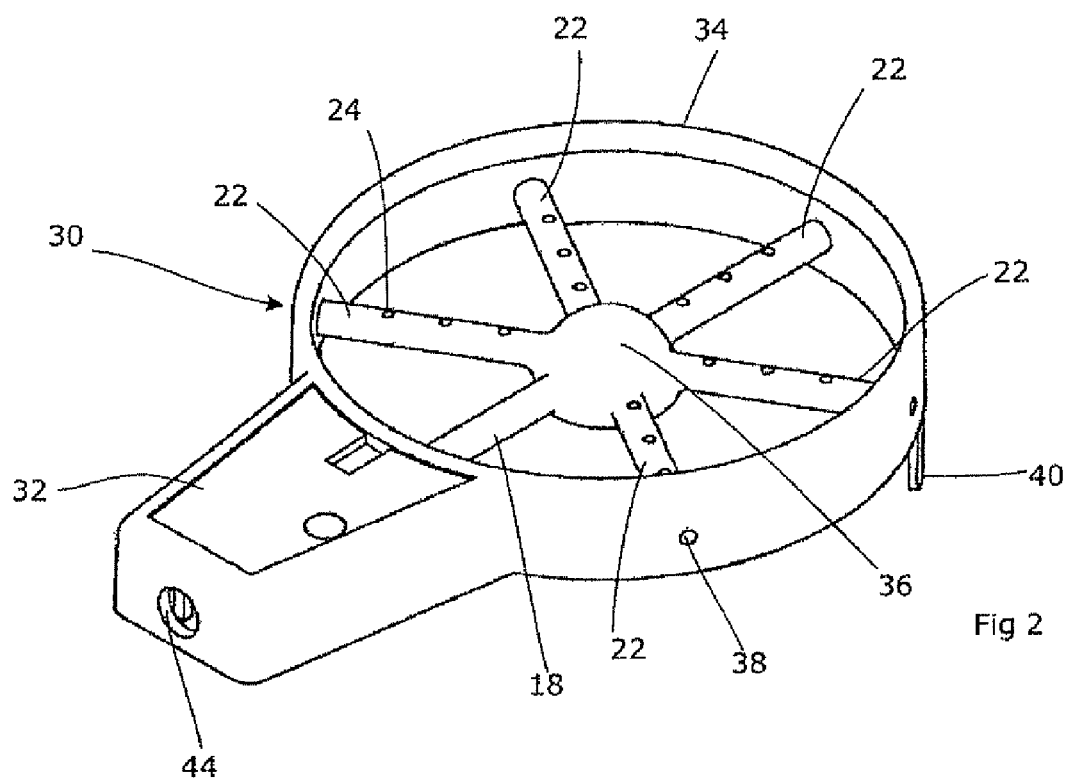
FIG. 2 shows a perspective view of the top region of a half-moulding suitable for assembling into the device of FIG. 1.

FIG. 2 shows a half-moulding 30 from which the device 10 of FIG. 1 can be produced. It is referred to as a half-moulding since the moulded item 30 provides approximately one half of the total device 10; two identical such half-mouldings 30 are assembled (together with other small parts) to form the device 10.

Thus, the half-moulding 30 of FIG. 2 is (by way of example) destined to form the front half of a device 10 and thus has a half handle 32, a half ring 34, a half hub 36 concentrically within the half ring 34, a conduit 18 leading from the half hub 36 to the half handle 32, and five spokes spaced at 60° intervals starting at the conduit 18 and leading from the half hub 36 to the half ring 34. Each spoke 22 has three apertures 24 facing axially forward with respect to the central axis of symmetry of the half ring 34.

An end aperture is also provided for each spoke 22, extending from the hollow interior of the spoke 22 to the exterior face of the half ring 34. This provision allows the half-moulding 30 to act as a rear half of a device 10 (in which case the spokes will be spokes 26 sensing static pressure). As part of the assembly process, these apertures 38 are sealed, for example by application of an adhesive tape to cover the aperture 38 or by insertion of a suitable plug into the end of the aperture 38. As a alternative, 50% of the half mouldings 30 could be prepared without apertures 38, but this would break the symmetry between the two items and hence double the tooling cost, increase inventory costs, etc.

A clip 40 extends from the half ring 34 towards the space that will be occupied by the companion half moulding that will make up the remainder of the device 10. This is at a location on the half ring 34 offset from the conduit 18 by slightly more than 120° (to avoid the apertures 38), and is balanced by a recess 42 shown in FIG. 3 at the mirror-image location on the half-ring 34. Thus, when the half-moulding 30 and its companion are mated, the clip 40 of the half-ring 30 mates with the recess of the companion, and the clip of the companion mates with the recess 42. Clip-locking elements in the clip 40 and the recess 42 of conventional design then ensure a snap fit between the half-moulding 30 and its companion.

Figure 3:
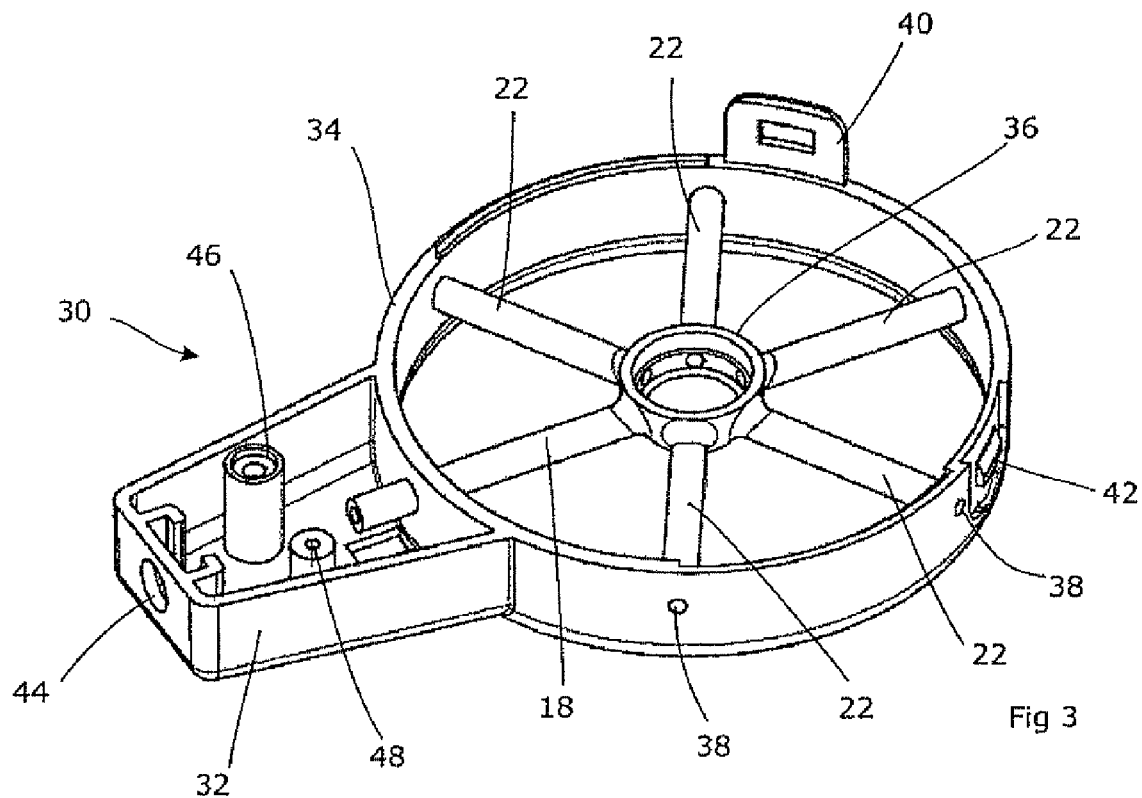
FIG. 3 shows a perspective view of the underside of the half-moulding of FIG. 2.

FIG. 3 shows the reverse side of the half-hub 36. It can be seen that this is a hemispherical shape (to provide the necessary streamlining) with the spokes 22 and conduit 18 communicating with the interior of the hemisphere. As a result, the pressures sensed by the spokes 22 can be averaged and sampled by the conduit 18. During assembly, a cap is fitted to the half-hub 36 to close the hemisphere and provide a sealed interior space. An O-ring can be provided between the moulded half-hub 36 and the moulded cap to ensure a sufficient seal is obtained.

The conduit 18 leads into a hollow space within the half-handle 32, and projects a short distance thereinto. This short projection acts as a connector for receiving a flexible hose that can convey the sensed pressure to a micromanometer. A circular hole 44 is provided in the half-handle opposite the conduit 18 to allow such a hose to leave the handle. Other forms of connector could be provided as desired or as required.

Pillars 46, 48 are provided within the half-handle 32 to mate with identical pillars on the companion half-moulding in a known fashion and secure the two parts together.

FIG. 4 shows a cross-section through the device 10. Air or another fluid to be measured flows through the ring 14 in the direction of arrow 50 and impinges on the apertures 24 of the spoke 22 to establish a dynamic pressure within the hollow interior of the spoke 22. This is conveyed to an interior space of the hub 16 defined by the half-hub hemisphere 36 and the cap 52. This is averaged with the dynamic pressures from the other spokes not visible in FIG. 4 and fed via the conduit 18 into a dynamic hose 54 connected to an end 56 of conduit 18. The dynamic hose 54 departs the handle 12 via the hole 44 to a micromanometer (not shown).

Likewise, the apertures 58 on the spoke 26, being directed in an opposite direction to the apertures 24, are able to sense a static pressure. The end apertures 28 are also able to sense a static pressure outside the ring 14. The static pressures sensed by the apertures 58 and end apertures 24 of the five spokes 26 are fed to a further interior space within the hub 16, this time defined by the rearmost half-hub 36' sealed by a further cap 52 and O-ring, where they are averaged and conveyed along the conduit 20 to a static hose 60 connected to an end 62 of the conduit 20. This likewise exits the handle 12 via a further hole 44'.

As can be seen in FIG. 4, there is an unimpeded flow path past the two sets of spokes. In this example, there is an empty space between the two sets of spokes and therefore air (or the fluid concerned) can flow freely past the first set of spokes and then past the second. It is not strictly necessary for there to be a complete empty space; some support structures of other bracing could be provided between the two sets of spokes and if this did not extend beyond the cross-sections of the spokes in the direction of flow then this would not impede the fluid flow. However, this can be contrasted with the arrangement shown in, for example, U.S. Pat. No. 4,453,419 in which there is a transverse plate between the two sets of spokes which causes fluid flowing past the first set to divert outwardly, thereby affecting the flow pattern.

FIG. 4 also shows a seal 62 in the form of an adhesive layer over the apertures 38 at the ends of the spokes 22. This adhesive layer can be in a number of short sections over each aperture 38, or it can be a band around the relevant half of the ring 14.

FIG. 5 shows an enlarged portion of the half-hub 36, in section. Spokes 22 lead into the half-hub 36 and their hollow interiors 64 communicate with the interior of the half-hub 36 via openings 66. A rear planar face of the half-hub 36 is initially open, but subsequently closed during assembly by way of a cap that seats opposite a shoulder 68 against which an O-ring can be compressed to provide a seal.

FIGS. 6 to 9 show graphs of the response of such a device, comparing various alternative embodiments. Data points are denoted as follows:
- ♦ a conventional vane anemometer
- X an embodiment according to FIGS. 1 to 5
- * an embodiment according to FIGS. 1 to 5 but without the apertures 58
- ● an embodiment according to FIGS. 1 to 5 but without the apertures 28

Figure 6:
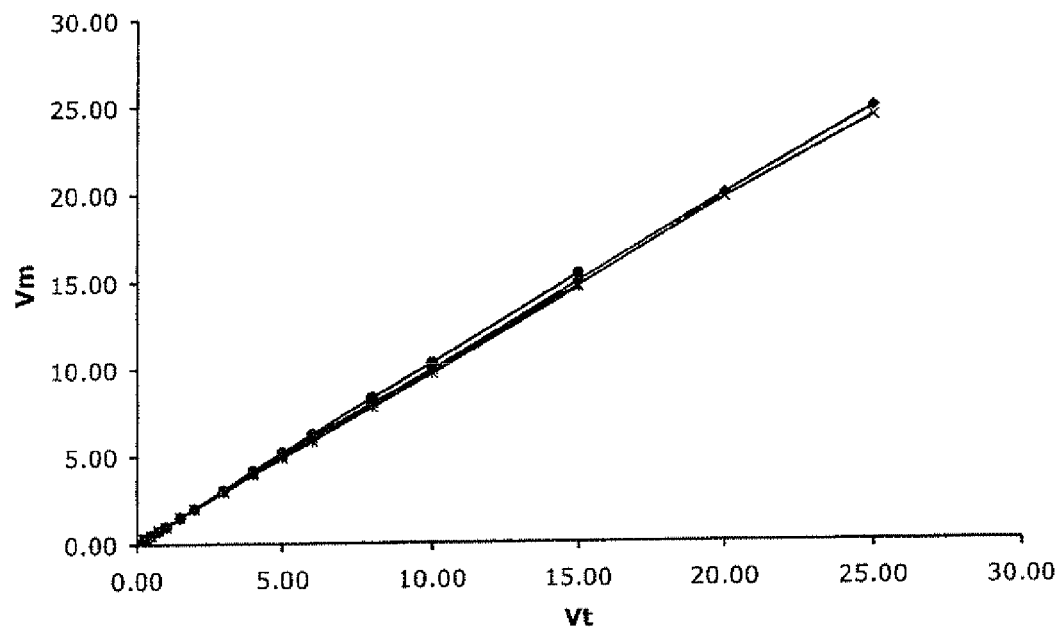
FIG. 6 shows a plot of actual air velocity ($V_t$) against measured air velocity ($V_m$) for a range of embodiments, between 0 and 25 ms$^{-1}$.

FIG. 6 shows the response at airflows between 0 and 25 $ms^{-1}$. Generally, all four show the same response at higher airflows. The absence of apertures 28 appears to give a proportionately slightly higher reading, but this could be corrected by suitable calibration.

Figure 7:
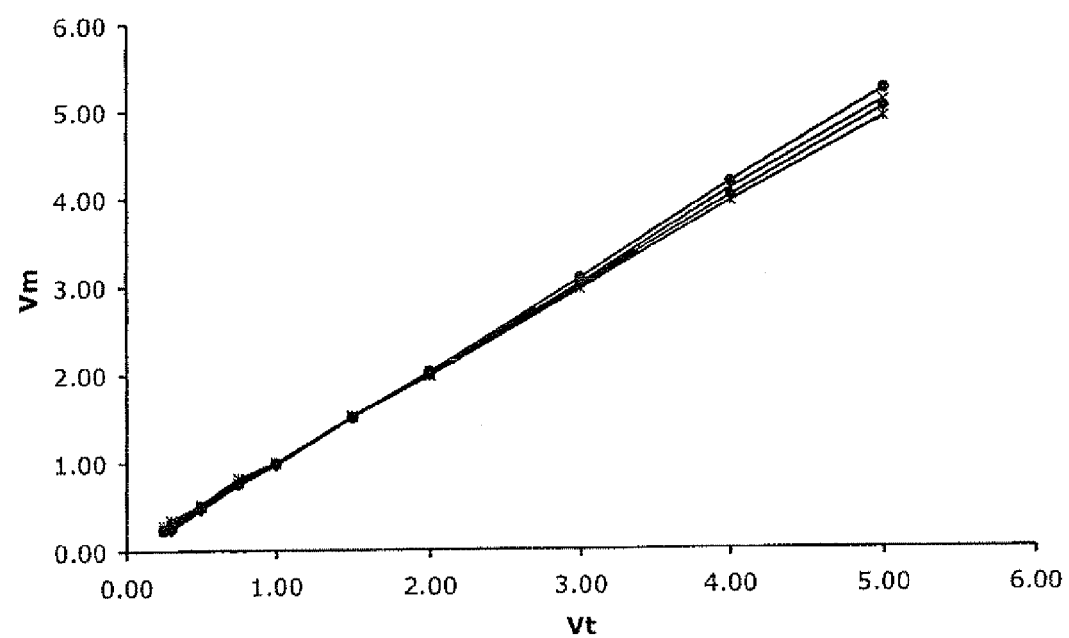
FIG. 7 shows a plot of actual air velocity ($V_t$) against measured air velocity ($V_m$) for a range of embodiments, between 0 and 5 ms$^{-1}$.

FIG. 7 shows the response at airflow speeds up to 5 $ms^{-1}$, and shows a generally linear response for all four embodiments in the region above 1 $ms^{-1}$. That linear response can be corrected as required through calibration.

Figure 8:
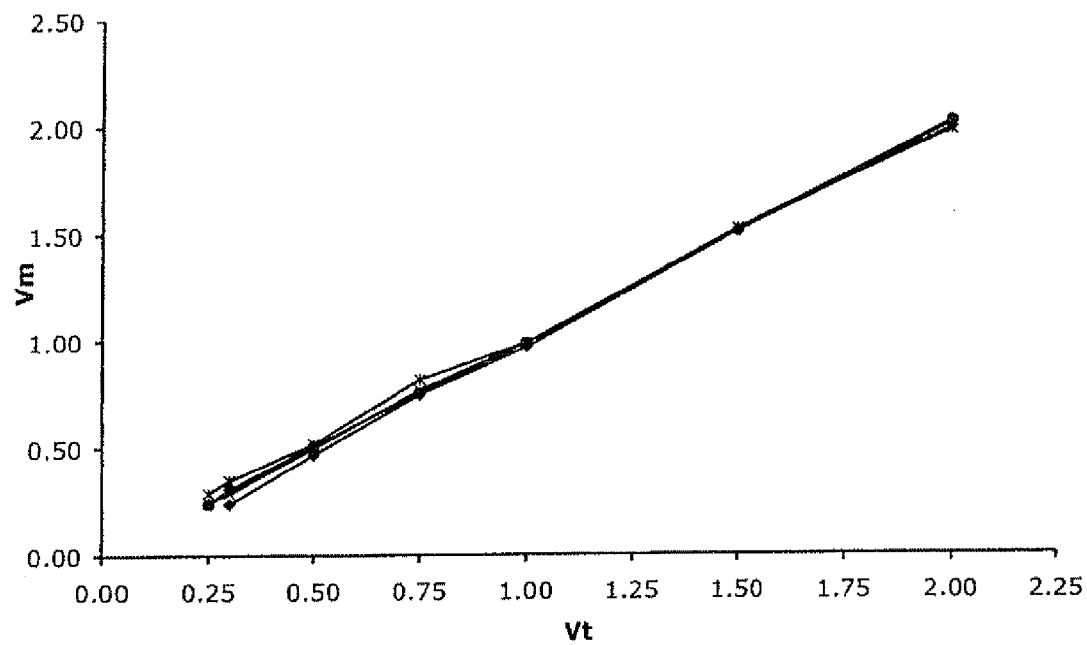
FIG. 8 shows a plot of actual air velocity ($V_t$) against measured air velocity ($V_m$) for a range of embodiments, between 0 and 2 ms$^{-1}$.
Figure 9:
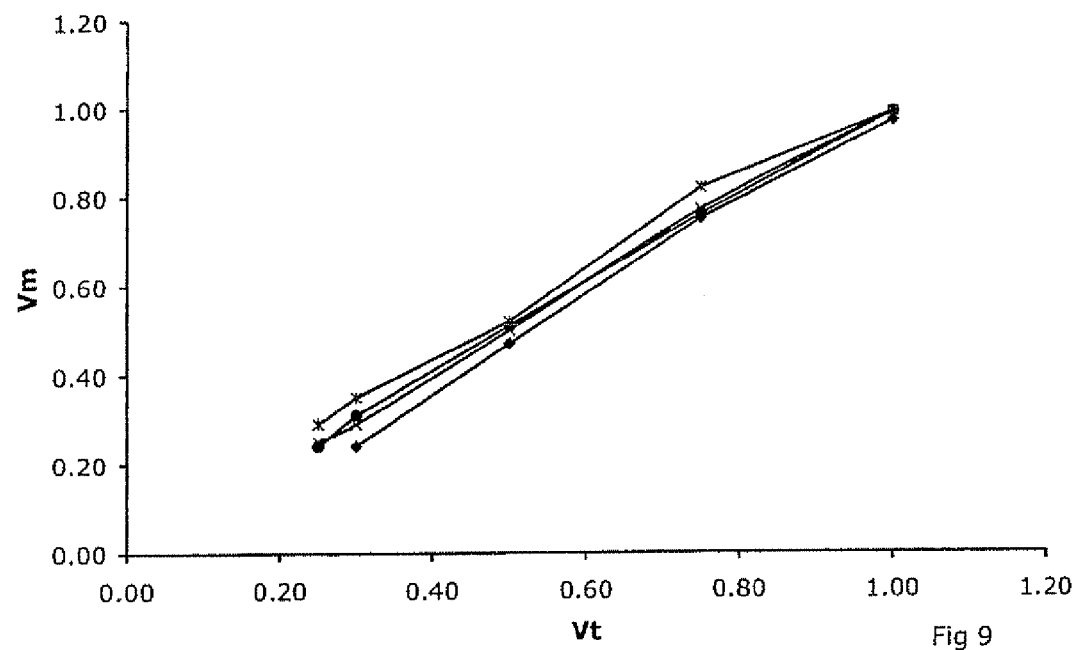
FIG. 9 shows a plot of actual air velocity ($V_t$) against measured air velocity ($V_m$) for a range of embodiments, between 0 and 1 ms$^{-1}$.

FIGS. 8 and 9 show the response at very low airspeeds of 1 $ms^{-1}$ or less, and highlight a departure from linearity for the embodiment without the apertures 58 comparable, albeit opposite, to a departure from linearity of the conventional anemometer. It would seem that at low air speeds, the rotational inertia of the anemometer vane reduces the measured airflow as compared to the actual airflow. This difficulty is of course not faced by a pitot-static device.

It should be borne in mind that the graphs of FIGS. 6 to 9 show a "best case" for the conventional anemometer. As the anemometer ages and is handled, the vanes and the rotating axle will inevitably degrade, creating additional resistance to rotation and uncertainties in the device calibration. No corresponding problems are applicable to a pitot-static device as described.

Figure 10:
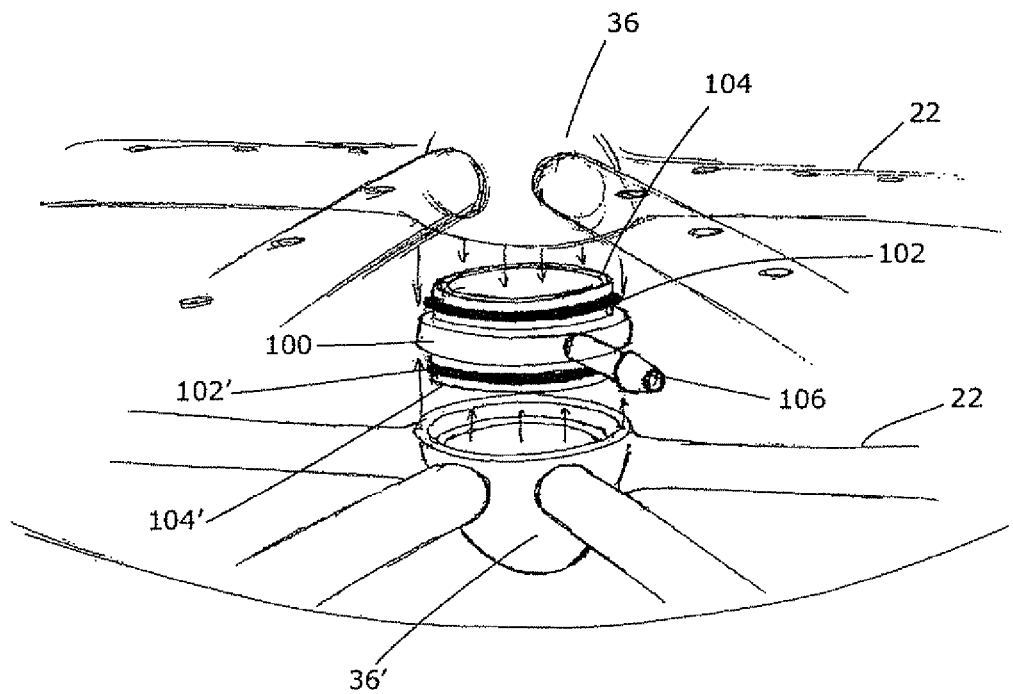
FIG. 10 shows an alternative constructional method for the device of the present invention.
Figure 11:
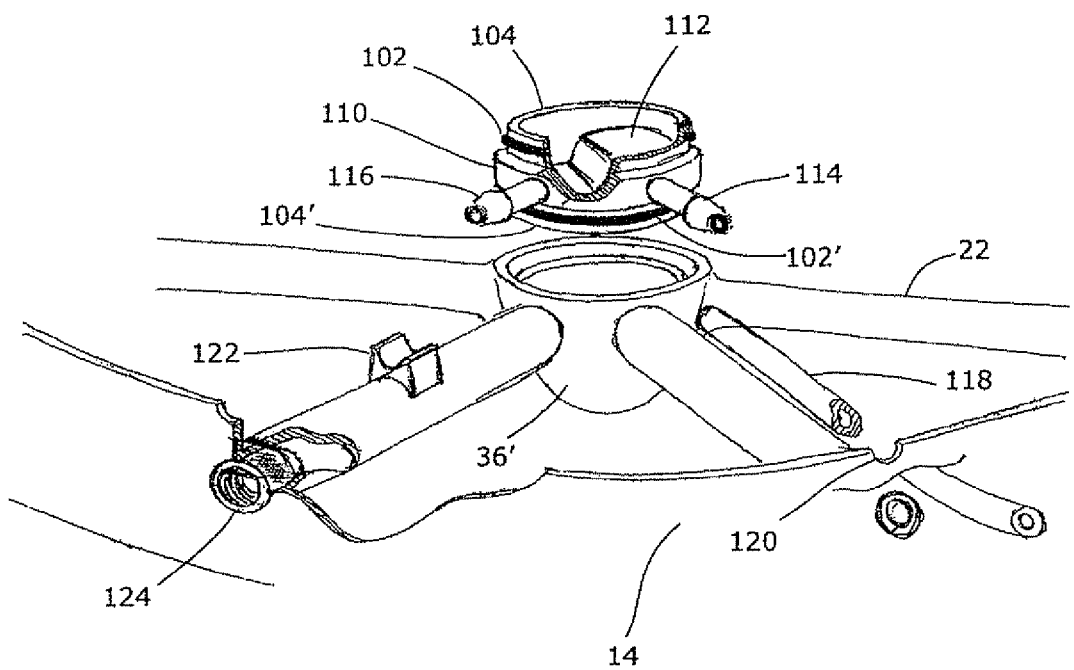
FIG. 11 shows a further alternative constructional method for the device of the present invention.

FIGS. 10 and 11 show alternative constructional methods for the hub region of the device. In FIG. 10, a single hub cap 100 sits between the two half-hubs 36, 36'. A pair of O-rings 102, 102' are provided around a corresponding pair of snap-fit joins 104, 104' which allow the cap 100 to fit to and seal with each of the two half-hubs 36, 36'. Assembly can be by fitting the cap to one half-hub 36' first, then pressing the second half-hub 36 into place, or otherwise.

An internal dividing wall (not visible) within the cap 100 prevents flow between the two half-hubs and thus allows the pressures to be sensed independently. The pressure measurements can be obtained from the outer ends of the spokes 22, or they can be extracted from the half-hubs. FIG. 10 shows a single port 106 which leads into the cap 100 above the dividing wall (as illustrated).

FIG. 11 shows an alternative hub cap 110, partially cut away to show the internal dividing wall 112. As can be seen, this is stepped so that in part of the hub it is closer to the half-hub 36 (not shown in FIG. 11, for clarity) and in another part it is closer to the half-hub 36'. This allows for two pressure ports 114, 166, spaced circumferentially around the cap 110 and thus communicating with different sides of the dividing wall 112. A flexible hose 118 is shown; the port 114 is oriented so as to lie between two spokes 22 and thus the hose 118 can fit between them for minimal obstruction to airflow. A half-aperture 120 is provided in each half-section of the ring 14 to allow the hose to pass through. An optional support 122 is provided on the adjacent spoke for the corresponding hose leading to the port 116; this could be replicated for the hose 118 if desired.

FIG. 11 also shows threaded inserts 124 moulded (or otherwise sealingly placed) into the ends of the spokes 22. These allow for the connection of pressure sensing hoses (as required) or for the insertion of blanking plates where required.

The above embodiments are provided with a handle 12 for ease of use and positioning. As an alternative, or in addition, a socket such as a threaded insert could be provided on the device. Suitable locations include in one half-hub 36 (or both if symmetricality is required) or in the handle 12 itself. These could allow for the device to be mounted on a pole (or the like) to permit readings to be taken from difficult-to-reach locations.

Accordingly, the present invention provides a device that is lightweight, easily portable, and thus able to act as a direct like-for like replacement of a vane anemometer. At the same time, it provides an ab initio improvement in accuracy over an anemometer at low airflow rates and is more robust in long-term use with no moving parts and no fragile parts exposed to handling damage.

The device of the present invention is also more robust, in that it can be cleaned by simply directing a jet of high pressure air or other gas through the conduits 18, 20. This will entrain any accumulated dust or grit and expel it via the apertures 24, 28. Dust or grit that enters the bearings of a vane anemometer is difficult or impossible to remove and will necessitate replacement of the mechanism.

It will of course be understood that many variations may be made to the above-described embodiment without departing from the scope of the present invention. For example, the device could be incorporated into a larger apparatus for testing purposes or to remain there permanently for monitoring purposes. Other layouts of the spokes could be adopted, with (for example) different numbers of spokes or different dispositions such as parallel or grid layouts.

Although the present invention has been described with reference to preferred embodiments, workers skilled in the art will recognize that changes may be made in form and detail without departing from the spirit and scope of the invention.

The invention claimed is:

1. A pitot-static device comprising first and second pluralities of hollow spokes extending in a radial direction from a central hub, the hollow interiors of the spokes of the first plurality being connected so as to allow fluid communication therebetween, and at least all but one of the spokes of the first plurality having at least one aperture facing in a first axial direction that is transverse to the radial direction, and the hollow interiors of the spokes of the second plurality being connected so as to allow fluid communication therebetween, and at least one of the spokes of the second plurality having an aperture at an end portion thereof that faces in the radial direction.

2. The pitot-static device according to claim 1, in which at least all but one of the spokes of the second plurality have an aperture at an end portion thereof that faces in the radial direction.

3. The pitot-static device according to claim 1, in which at least one of the spokes of the first plurality has an aperture at an end thereof sealed against fluid communication.

4. The pitot-static device according to claim 3, in which at least all but one of the spokes of the first plurality have an aperture at an end thereof sealed against fluid communication.

5. A The pitot-static device according to claim 1, further comprising a handle for manual support.

6. A pitot-static device, comprising:

a central hub;

a first plurality of hollow spokes extending in a radial direction from the central hub;

a second plurality of hollow spokes extending in a radial direction from the central hub;

the hollow interiors of the spokes of the first plurality being connected so as to allow fluid communication therebetween, and at least all but one of the spokes of the first plurality having at least one aperture facing in a first axial direction that is transverse to the radial direction;

the hollow interiors of the spokes of the second plurality being connected so as to allow fluid communication therebetween, and at least all but one of the spokes of the second plurality having at least one aperture; and a handle for manual support.

7. The pitot-static device according to 6, further comprising a ring around the central hub, the spokes extending from the central hub to an inner face of the ring.

8. The pitot-static device according to claim 7, in which at least the spokes of the second plurality each have an aperture at an end thereof, the end apertures extending through the ring.

9. The pitot-static device according to claim 7, in which the handle is attached to the ring.

10. The pitot-static device according to claim 6, further comprising:
a conduit extending from the central hub to the handle.

11. The pitot-static device according to claim 10, in which the conduit is free from apertures between the central hub and the handle.

12. The pitot-static device according to claim 6, in which the handle includes a connector for connection to external fluid conduits.

13. A pitot-static device, comprising a hub from which extends a plurality of spokes integrally moulded with a part of the hub, each spoke having a hollow interior that is in fluid communication with an interior space of the hub and at least one aperture to sense a fluid pressure, the hub being formed of a concave section and a cap attached thereto so as to close the concave section and define the interior space.

14. A pitot-static device, comprising a hub from which extend first and second pluralities of hollow spokes,
the spokes of the first plurality being connected via a first internal space within the hub so as to allow fluid communication between the hollow interiors thereof, and at least all but one of the spokes of the first plurality having at least one aperture facing in a first axial direction that is transverse to the spokes of the first plurality,
the spokes of the second plurality being connected via a second internal space within the hub so as to allow fluid communication between the hollow interiors thereof, and at least all but one of the spokes of the second plurality having at least one aperture,
wherein the hub is defined by at least three parts, comprising two concave sections being
moulded integrally with, respectively, the spokes of the first and the second pluralities, and
at least one cap connected to the concave sections, thereby to close the concave section and define the internal spaces.

15. The pitot-static device according to claim 14, in which there are two caps, one connected to each concave section.

16. The pitot-static device according to claim 14, in which an o-ring is interposed between the or each cap and each concave part.

17. A pitot-static device, comprising first and second pluralities of hollow spokes,
the spokes of the first plurality being connected so as to allow fluid communication between the hollow interiors thereof, and all but one spoke of the first plurality having at least one aperture facing in a first axial direction that is transverse to the spokes of the first plurality,
the spokes of the second plurality being connected so as to allow fluid communication between the hollow interiors thereof, and all but one spoke of the second plurality having at least one aperture,
wherein the spokes extend radially from a central hub, the hollow interiors of the spokes of the first plurality being connected via a first interior space within the central hub, the hollow interiors of the spokes of the second plurality being connected via a second interior space within the central hub, and the one spoke of each plurality is free from apertures other than at an end thereof.

18. The pitot-static device according to claim 17, in which the spokes of the second plurality include apertures facing in a second axial direction that is opposed to the first axial direction.

19. The pitot-static device according to claim 14, in which at least all but one of the second plurality of spokes each have an aperture at the end thereof.

20. The pitot-static device according to claim 14, in which at least all but one of the spokes of the first plurality have an aperture at an end thereof, the end apertures being sealed against fluid communication.

21. A pitot-static device, comprising first and second pluralities of hollow spokes, the hollow interiors of the spokes of the first plurality being connected so as to allow fluid communication therebetween and each spoke of the first plurality having at least one aperture facing in a first axial direction that is transverse to the spokes of the first plurality, the hollow interiors of the spokes of the second plurality being connected so as to allow fluid communication therebetween and each spoke of the second plurality having at least one aperture facing in a second axial direction that is opposed to the first axial direction.

22. The pitot-static device according to claim 21, in which the spokes extend radially from a central hub.

23. The pitot-static device according to claim 22, in which the hollow interiors of the spokes of at least one of the pluralities are connected via an interior space within the central hub.

24. The pitot-static device according to claim 22, in which the spokes of both the first and second pluralities extend from a single central hub.

25. The pitot-static device according to claim 23, in which the spokes of both the first and second pluralities extend from a single central hub having a first interior space to allow fluid communication between the spokes of the first plurality and a second interior space to allow separate fluid communication between the spokes of the second plurality.

26. The pitot-static device according to a claim 21, in which the second plurality of spokes each have an aperture at the end thereof.

27. The pitot-static device according to claim 26, in which the spokes of the first plurality each have an aperture at an end thereof, the end apertures being sealed against fluid communication.

28. A pitot-static device, comprising a plurality of hollow spokes extending in a first direction, wherein the hollow interiors of the spokes are connected so as to allow fluid communication therebetween, and at least all but one of the spokes has at least one aperture facing in a second, axial direction that is transverse to the first direction.

* * * * *